United States Patent
Sugawara et al.

(10) Patent No.: US 8,209,116 B2
(45) Date of Patent: Jun. 26, 2012

(54) NAVIGATION APPARATUS, NAVIGATION SERVER, AND NAVIGATION SYSTEM

(75) Inventors: Aiko Sugawara, Minato-ku (JP);
Takeshi Imai, Minato-ku (JP);
Tadafumi Nogawa, Minato-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 83 days.

(21) Appl. No.: 12/377,402

(22) PCT Filed: Jul. 13, 2007

(86) PCT No.: PCT/JP2007/064017
§ 371 (c)(1),
(2), (4) Date: Feb. 13, 2009

(87) PCT Pub. No.: WO2008/020517
PCT Pub. Date: Feb. 21, 2008

(65) Prior Publication Data
US 2010/0223001 A1 Sep. 2, 2010

(30) Foreign Application Priority Data
Aug. 16, 2006 (JP) ................. 2006-222071

(51) Int. Cl.
*G01C 21/00* (2006.01)
(52) U.S. Cl. ............. 701/201; 455/412.1; 709/203; 340/988; 340/990
(58) Field of Classification Search ............. 701/201, 701/209, 117, 408; 455/412.1; 709/203; 340/995.21, 988, 990
See application file for complete search history.

(56) References Cited

U.S. PATENT DOCUMENTS

| | | | | |
|---|---|---|---|---|
| 6,498,569 | B2 * | 12/2002 | Dijkstra | 340/901 |
| 7,228,229 | B2 * | 6/2007 | Odagawa et al. | 701/539 |
| 7,683,805 | B2 * | 3/2010 | Amano | 340/935 |
| 2002/0035430 | A1 * | 3/2002 | Yano et al. | 701/209 |

(Continued)

FOREIGN PATENT DOCUMENTS

CN 1517680 8/2004
(Continued)

OTHER PUBLICATIONS

International Search Report for Application No. PCT/JP2007/064017, dated Oct. 16, 2007.

(Continued)

*Primary Examiner* — Redhwan K Mawari
(74) *Attorney, Agent, or Firm* — Nelson Mullins Riley & Scarborough LLP; Anthony A. Laurentano

(57) ABSTRACT

Provided is a navigation system capable of outputting situation information of a specified area according to real-time traffic information including a traffic regulation. A navigation apparatus can make a user recognize the moment when a vehicle (Q) enters a specified area (A) where a situation which affects the travel of the vehicle (Q) along a navigation route (r) is generated and the situation (inf(A)) indicating the situation by using an icon (x) indicating an entry position ($p_{in}$) and having a design decided according to the situation information (inf(A)). The navigation apparatus also can advice the user to instruct the navigation apparatus to perform an appropriate countermeasure in accordance with the situation such as re-search of the navigation route (r) or detour from the navigation route (r) being outputted.

1 Claim, 4 Drawing Sheets

U.S. PATENT DOCUMENTS

| | | | |
|---|---|---|---|
| 2004/0181340 A1* | 9/2004 | Smith | 702/3 |
| 2005/0027449 A1* | 2/2005 | Marsh | 701/213 |
| 2005/0043880 A1* | 2/2005 | Yamane et al. | 701/200 |
| 2005/0096839 A1* | 5/2005 | Nakano et al. | 701/200 |
| 2006/0058940 A1* | 3/2006 | Kumagai et al. | 701/117 |
| 2007/0273555 A1* | 11/2007 | Amano | 340/935 |
| 2010/0223001 A1* | 9/2010 | Sugawara et al. | 701/201 |

FOREIGN PATENT DOCUMENTS

| | | |
|---|---|---|
| DE | 10139668 A1 | 2/2003 |
| EP | 1087206 A1 | 3/2001 |
| EP | 1635142 A2 | 3/2006 |
| JP | 2000-113258 | 4/2000 |
| JP | 2002-156236 | 5/2002 |
| JP | 2003-51096 | 2/2003 |
| JP | 2003-121172 | 4/2003 |
| WO | WO-00/62019 A1 | 10/2000 |

OTHER PUBLICATIONS

Supplementary European Search Report for Application No. 07790797.0, dated Aug. 7, 2009.

Chinese Office Action for Application No. 200780030212.2, dated Aug. 20, 2010.

* cited by examiner

NAVIGATION APPARATUS, NAVIGATION SERVER, AND NAVIGATION SYSTEM

PRIORITY CLAIM

The present application is a 35 U.S.C. 371 filing of International Patent Application Number PCT/JP2007/064017 filed on Jul. 13, 2007, which is based on and claims the priority benefit of Japanese Patent Application 2006-222071 filed on Aug. 16, 2006, the contents of which are incorporated herein by reference in its entirety.

The present application is based on and claims the priority benefit of Japanese Patent Application 2006-222071 filed on Aug. 16, 2006, the contents of which are incorporated herein by reference in its entirety.

BACKGROUND OF THE INVENTION

1. Field of the Invention

The present invention relates to a navigation apparatus which is configured to guide a mobile subject, a navigation server which is configured to support the guidance of the mobile subject performed by the navigation apparatus on the basis of communication with the navigation apparatus, and a navigation system comprised of the navigation apparatus and the navigation server.

2. Description of the Related Art

There has been disclosed an art which displays information for specifying an area where the traffic may be obstructed by weather conditions or the like on a navigation apparatus, and re-searches a route on a condition that a preliminarily searched route is contained in the specified area (for example, refer to Japanese Patent Laid-open No. 2002-156236, paragraphs 0040, 0041, 0056 and 0059, FIG. 3 and FIG. 5).

However, in the case where a traffic regulation is not conducted in the specified area and therefore it is not necessary to detour along the re-searched route, as a result, the detour may make a vehicle travel a longer distance than necessary.

SUMMARY OF THE INVENTION

The present invention has been accomplished in view of the aforementioned problems, and it is therefore an objective of the present invention to provide a navigation apparatus which may output information relating to situation information of a specified area on the basis of real-time traffic information including a traffic regulation.

The navigation apparatus according to a first aspect of the present invention, which is configured to guide a mobile subject on the basis of communication with a navigation server, includes: a first processing element which is configured to define a navigation route joining a present position and a destination position of the mobile subject on the basis of navigation map information stored in a navigation map storing element and road traffic information distributed or broadcasted from the navigation server; and a second processing element which is configured to recognize a specified area and situation information representing a situation which affects the movement of the mobile subject in the specified area on the basis of communication with the navigation server, determine whether an entry position to the specified area is present in the navigation route defined by the first processing element, and output an icon having a design in relation to the situation information to the entry position on a map based on the navigation map on a condition that the presence of the entry position is determined.

According to the navigation apparatus of the first aspect of the present invention, in the case where the mobile subject is moving along the navigation route, a user may recognize the entry position of the mobile subject to the specified area and the situation information of a situation happening or possible to happen in the specified area via an icon. Thereby, it is possible for the user to take an appropriate action according to the situation information, such as determining whether to detour the specified area, issuing a re-searching instruction for another route to the navigation apparatus on the basis of the determination, or detouring along the navigation route outputted.

A second aspect of the present invention is dependent on the first aspect of the present invention, wherein the second processing element recognizes a distance from the present position of the mobile subject to the entry position to the specified area in the navigation route, and outputs an approaching notification indicating an approach to the specified area on a condition that the distance is equal to or smaller than a predefined distance.

According to the navigation apparatus of the second aspect of the present invention, it is possible for a driver of the mobile subject to recognize the approach of the entry position to the specified area from the output of the approaching notification when the mobile subject is moving along the navigation route.

According to the navigation server of the third aspect of the present invention, it is possible for the navigation apparatus to recognize whether an entry position to the specified area is present in a navigation route where the mobile subject is moving and the situation information of the specified area. According thereto, it is possible for the navigation apparatus to output or display an icon having a design corresponding to the entry position and the situation information at an appropriate position on the map. Thereby, it is possible for the user to take an appropriate action according to the situation information, such as determining whether to detour the specified area, issuing a re-searching instruction for another route to the navigation apparatus on the basis of the determination, detouring along the outputted navigation route, or the like.

To attain the aforementioned problems, a navigation system of a fourth aspect of the present invention is comprised of the navigation apparatus of the first aspect or the second aspect of the present invention, and the navigation server of the third aspect of the present invention.

According to the navigation system of the fourth aspect of the present invention, it is possible for a user to recognize whether an entry position to the specified area is present in the navigation route where the mobile subject is moving and the situation information of the specified area via the navigation apparatus. Accordingly, it is possible for the user to take an appropriate action according to the situation information, such as issuing a re-searching instruction for another route to the navigation apparatus on the basis of the determination, detouring along the outputted navigation route, or the like.

DETAILED DESCRIPTION OF THE PREFERRED EMBODIMENTS

Hereinafter, embodiments of a navigation apparatus, a navigation server and a navigation system according to the present invention will be described in detail with reference to the drawings.

Figure 1:
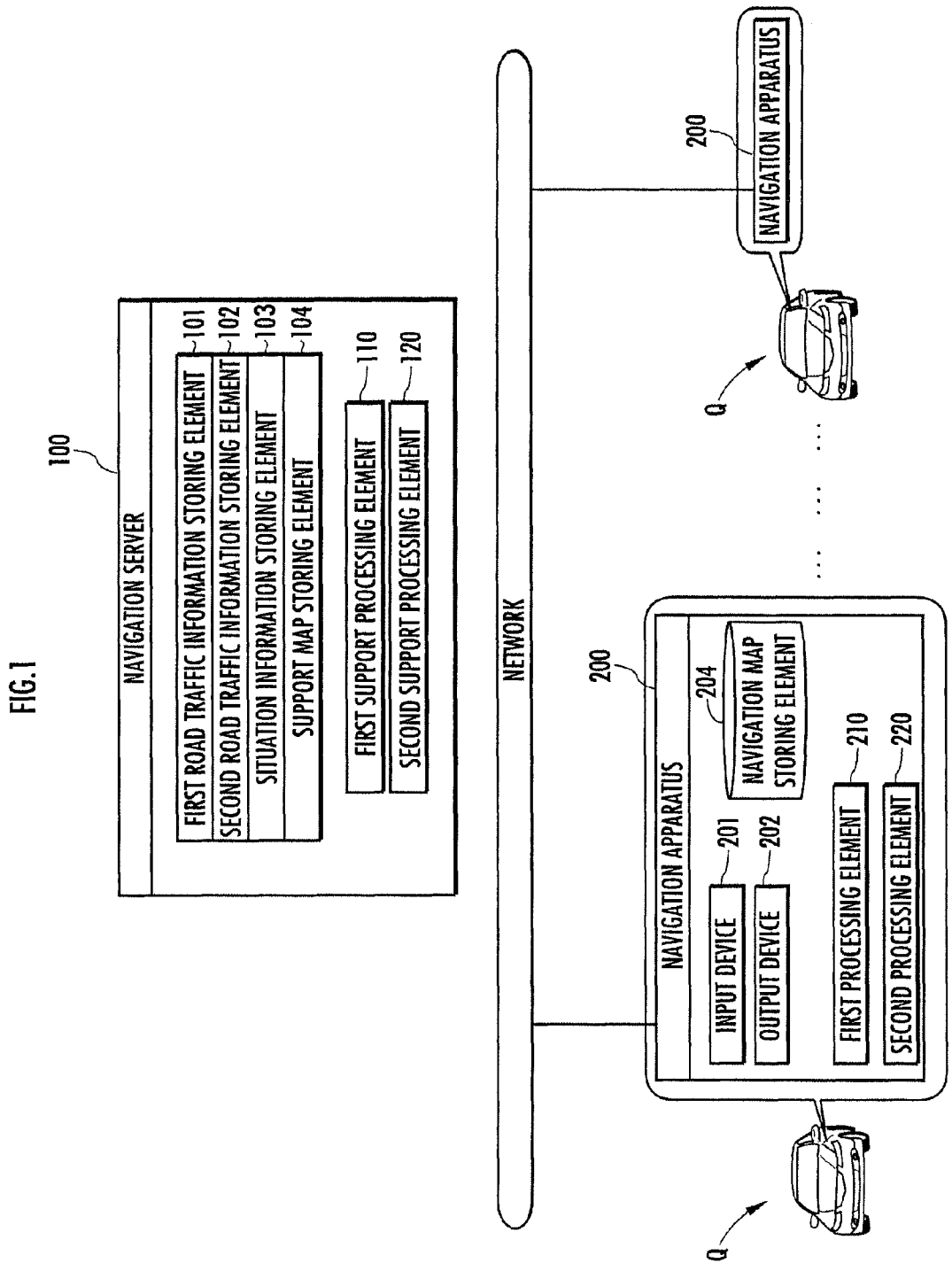
FIG. 1 is a structural diagram illustrating a configuration of a navigation system according to the present invention.
Figure 2:
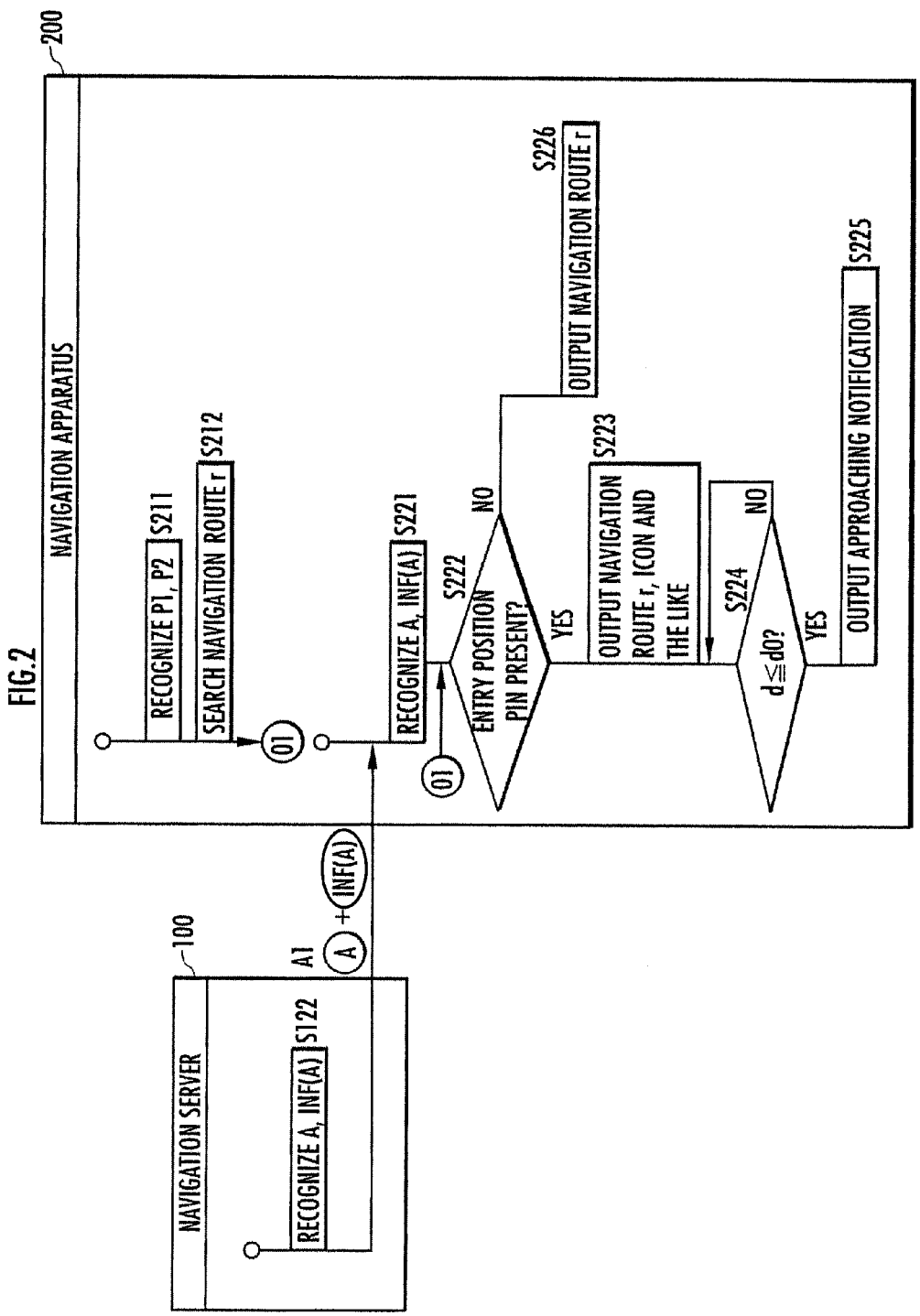
FIG. 2 is a functional diagram illustrating the functions of the navigation system according to the present invention.
Figure 3:
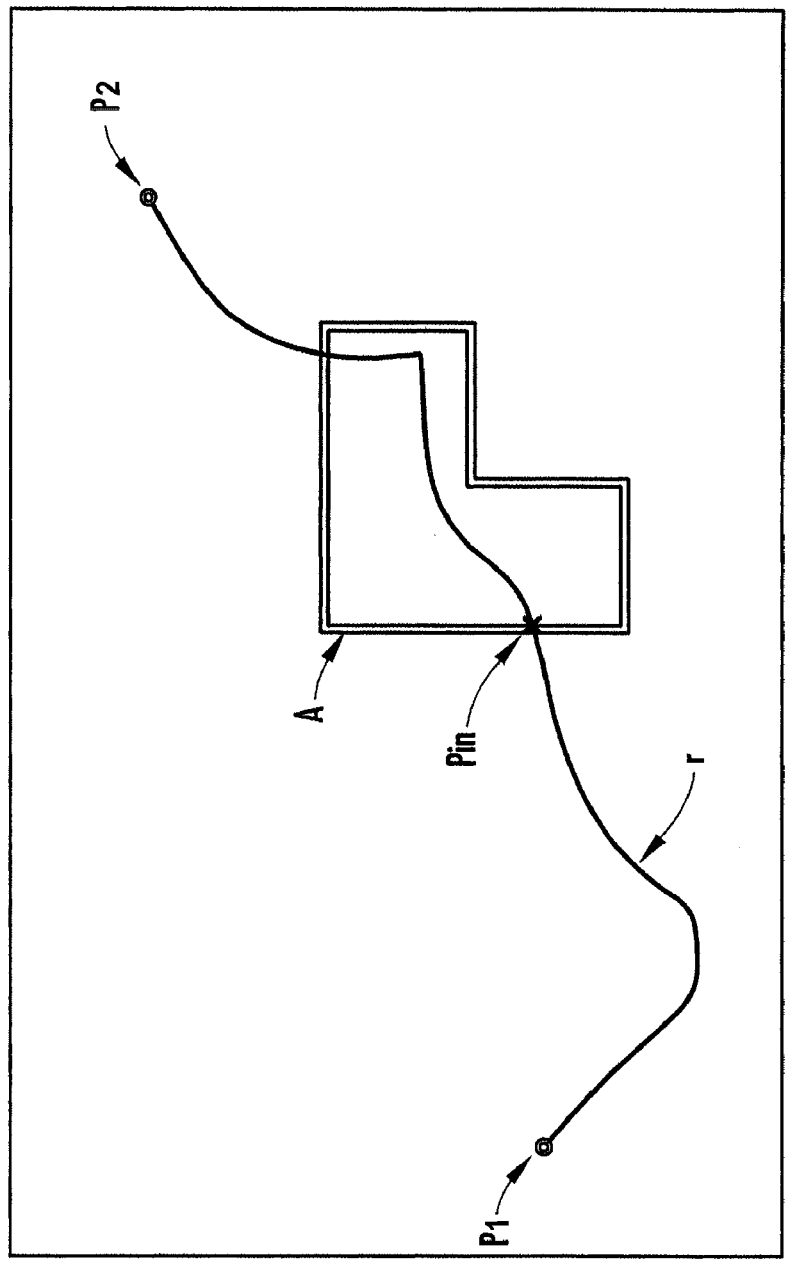
FIG. 3 is a functional diagram illustrating the functions of the navigation system according to the present invention.
Figure 4:
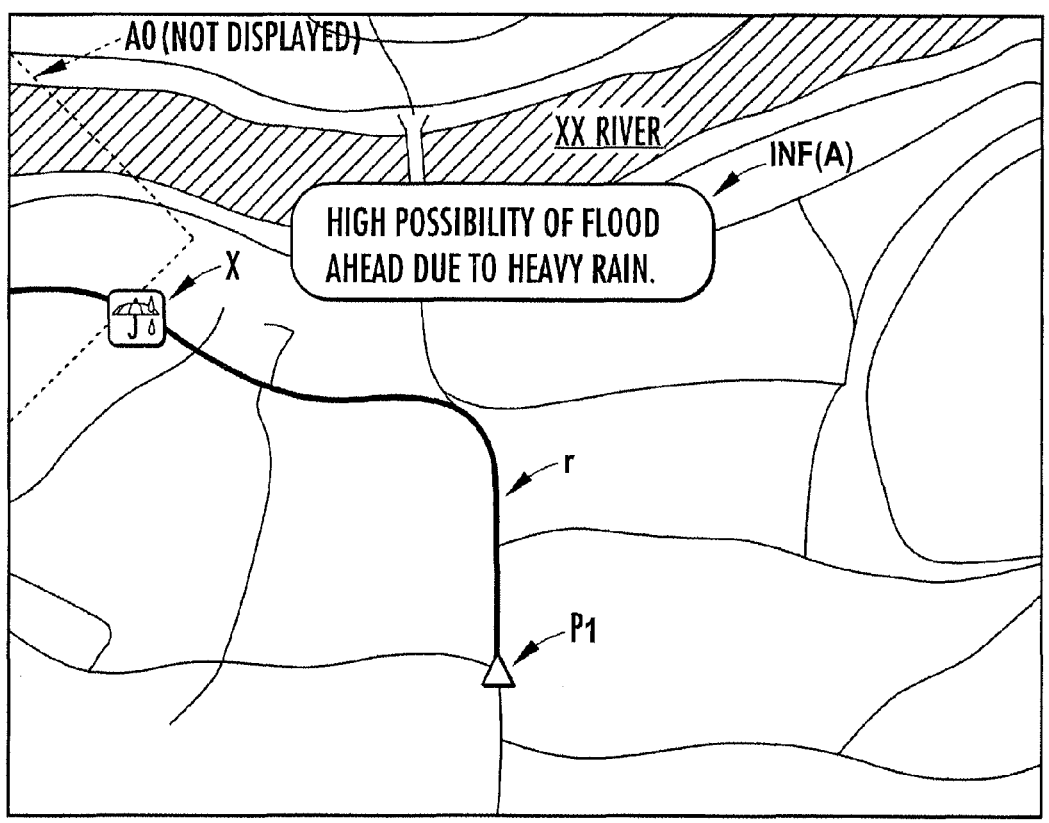
FIG. 4 is a functional diagram illustrating the functions of the navigation system according to the present invention.

FIG. 1 is a structural diagram illustrating the configuration of the navigation system of the present invention. FIG. 2 to FIG. 4 are functional diagrams of the navigation system of the present invention.

The configuration of the navigation system of the present invention will be described with reference to FIG. 1.

The navigation system is comprised of a navigation server 100, and a navigation apparatus 200 which is mounted in a vehicle (mobile subject) Q. It should be noted that the navigation apparatus 200 may be mounted in a mobile subject other than a vehicle. It is also acceptable for the navigation apparatus 200 to be carried by a user.

The navigation server 100 is comprised of one or a plurality of server computers. The navigation server 100 is provided with a first road traffic information storing element 101, a second road traffic information storing element 102, a situation information storing element 103, a support map storing element 104, a first support processing element 110, and a second support processing element 120.

The first road traffic information storing element 101 is stored with first road traffic information (required moving time, traffic congestion information or the like for an individual link) on the basis of probe information (position of an individual probe car at an individual time) transmitted or uploaded from the navigation apparatus 200 to the navigation server 100. The navigation apparatus 200 is mounted in a vehicle Q which serves as a probe car or a floating car.

The second road traffic information storing element 102 is stored with second road traffic information (traffic regulation information, event information around an individual link, event type information if there were an event and the like, in addition to the required moving time and traffic congestion information for the individual link) transmitted from a road traffic information center server or the like to the navigation server 100.

The situation information storing element 103 is stored with an area (a specified area) where a situation which is possible to exert obstruction against the moving or traveling of the vehicle Q is happening or is possible to happen, and situation information of the situation (summary of the situation, effect extent of the situation against the moving of the vehicle Q). The specified area and the situation information are associated to each other. The specified area and the situation information stored in the situation information storing element 103 may be updated appropriately according to the variations of the specified area and the situation information, respectively.

The support map storing element 104 is stored with support map information. In the support map information, the location, shape and posture or the like of an individual link constituting a road are expressed by a series of coordinates ((latitude, longitude), or (latitude, longitude, altitude)). Moreover, an individual link is tagged with link identification information for identifying the individual link and road type data. The boundary of an individual area is defined according to the series of coordinates of the support map information stored in the support map storing element 104.

The first support processing element 110 searches or retrieves the situation information from the situation information storing element 103. The second support processing element 120, on the basis of communication with the navigation apparatus 200, causes the navigation apparatus 200 to recognize the specified area A and the situation information inf(A).

The navigation apparatus 200 is comprised of an ECU or a computer mounted in the vehicle Q as hardware, and a navigation program which provides the computer with various functions. It should be noted that the navigation program may be pre-installed in the memory (ROM) in the vehicular computer; or the entire or a part of the navigation program may be downloaded or broadcasted from a server (not shown) via a network or a satellite to the vehicular computer to store in the memory (EEPROM, RAM) or the like thereof at an arbitrary timing when there is a request or the like from the vehicular computer.

The navigation apparatus 200 is provided with an input device 201, an output device 202, a navigation map storing element 204, a first processing element 210, and a second processing element 220.

The input device 201 is comprised of operating buttons disposed in a center console and a microphone in the vehicle Q. It is possible for a user to perform various settings by operating or vocally instructing the input device 201. The output device 202 is a display device disposed in the center console of the vehicle Q for displaying or outputting map information or the like.

The navigation map storing element 204 is stored with navigation map information or the like to be output to the output device 202. In the navigation map information, the location, shape and posture or the like of an individual link constituting a road are expressed by a series of coordinates. Moreover, an individual link is tagged with the link identification information for identifying the individual link. Even the definitions of the coordinates in the navigation map information and the support map information are different due to the different specifications and data architectures therebetween, it is possible to match the links by tagging the identical links with common link identification information.

The first processing element 210 searches or defines a navigation route r which is comprised of a plurality of links and joins a present position $p_1$ and a destination $p_2$ of the vehicle Q.

The second processing element 220 recognizes the specified area A and the situation information inf(A) representing a situation which will affect the moving of the vehicle Q in the specified area A, and outputs the navigation route r defined by the first processing element 210 to the output device 202.

Further, the second processing element 220 determines whether an entry position $p_{in}$ to the specified area A is present in the navigation r. On a condition that the presence of the entry position $p_{in}$ is determined, the second processing element 220 displays the entry position $p_{in}$ on a map based on the navigation map information and outputs an icon x having a design corresponding to the situation information inf (A) to the output device 202.

Furthermore, the second processing element 220 recognizes a distance from the present position $p_1$ to the entry position $p_{in}$ along the searched navigation route r, and outputs a notification when the distance is equal to or smaller than a predefined distance.

Note that "a component of the navigation server 100 or the navigation apparatus 200 which serves as hardware "recognizes" information" means that the component performs a possible information processing on a piece of information to prepare the piece of information ready for other information processing, for example, the component receives the piece of information; searches the piece of information in a database or memory or retrieves the piece of information from a database or memory; calculates, estimates, configures, determines, searches the piece of information or the like via arithmetic processing on the basis of the received basic information or the like; elicits information by decoding packages; and stores in memory or the like the calculated information or the like. In addition, "a component serving as hardware "outputs" information" means that the component outputs the information in form of picture, voice, vibration and the like, which may be recognized by a human by means of five senses thereof such as eyesight, hearing, touch, etc.

The function of the navigation system with the above-mentioned configuration will be explained with reference to FIG. 2 through FIG. 4.

The first processing element 210 in the navigation apparatus 200 recognizes the present position $p_1$ and the destination position $p_2$ of the vehicle Q (FIG. 2/S211). The present position of the vehicle Q is calculated or determined according to an arithmetic computation on GPS signals received by a GPS receiver, or output signals from a vehicular acceleration sensor or a vehicular gyro sensor. The destination position $p_2$ of the vehicle Q is defined or recognized on the basis of operation signals inputted via the input device 201 to the navigation apparatus 200 or phonetic signals issued by the user.

The first processing element 210 retrieves the navigation map information from the navigation map storing element 204, and receives the road traffic information (containing the first road traffic information and the second road traffic information) distributed or broadcasted from the navigation server 100. Thereafter, on the basis of the navigation map information and the road traffic information, the first processing element 210 searches one or a plurality of routes joining the present position $p_1$ and the destination position $p_2$ of the vehicle Q (FIG. 2/S212). The road traffic information contains cost (required moving time or the like) for an individual link. If the cost for a link where traffic regulation, for example, is probably conducted is high, a route which does not contain the link may be searched in high priority. Accordingly, the navigation route r which joins the present position $p_1$ and the destination position $p_2$ of the vehicle Q and contains a plurality of links is searched or defined, as illustrated in FIG. 3, for example.

In the navigation server 100, the first support processing element 110 searches the specified area A and the situation information inf(A) from the situation information storing element 103 (FIG. 2/S122). Thereby, a framed specified area A illustrated in FIG. 3, for example, is recognized. The situation information inf(A) includes weather-relating information or natural phenomenon-relating information, such as "The precipitation is surpassing 00 mm/h, therefore, it is possible for the floods or the earth-flow disaster to happen.", "The vision is bad due to fog.", "There is a earth fissure occurred." and the like, and man-made disaster-related information, such as "The vehicles involved in the traffic accident are still left on the road.", "There is a fire nearby." and the like. Thereafter, the second support processing element 120 distributes or broadcasts the specified area A and the situation information inf(A) to the navigation apparatus 200 (FIG. 2/Arrow A1).

Accordingly, the second processing element 220 receives or recognizes the specified area A and the situation information inf (A) distributed or broadcasted from the navigation server 100 (FIG. 2/S221). Thereafter, the second processing element 220 determines where the entry position $p_{in}$ to the specified area A is present in the navigation route r searched by the first processing element 210 (FIG. 2/S222). For example, in the case where the mobile subject is passing the specified area A in the searched navigation route r as illustrated in FIG. 3, the presence of the entry position $p_{in}$ is determined.

In the case where the presence of the entry position $p_{in}$ is determined (FIG. 2/S222 . . . YES), the second processing element 220 outputs the icon x indicating the entry position $p_{in}$ at the searched navigation router to the output device 202 (FIG. 2/S223). Thereby, as illustrated in an example in FIG. 4, a map with the searched navigation route r, the icon x and the situation information inf(A) is displayed on the output device 202. The design of the icon x is configured in association with the situation information inf(A) and is stored in memory.

Subsequently, the second processing element 220 recognizes or measures a distance from the present position $p_1$ of the vehicle Q to the entry position $p_{in}$ to the specified area A. Thereafter, the second processing element 220 determines whether the distance is within a predefined distance (FIG. 2/S224).

If the determination result is positive (FIG. 2/S224 . . . YES), an approaching notification indicating an approach to the entry position $p_{in}$ to the specified area A is outputted. Thereby, for example, when the distance is equal to or smaller than the predefined distance, a piece of message, such as "The road ahead is slippery due to rain." or the like is displayed on the output device (display device) 202; or the aforementioned message or a pop sound is phonetically output to the output device (speaker) 202.

On the other hand, if the entry position $p_{in}$ is determined to be absent (FIG. 2/S222 . . . NO), the second processing element 220 retrieves the navigation route r from memory, overlaps the navigation route r on the map based on the navigation map information and output it to the output device 202 (FIG. 2/S226).

According to the navigation system exhibiting the functions mentioned above, in the case where the vehicle Q enters moves along the searched navigation route r, the enter to the specified area A and the situation information inf (A) of a situation happening in the specified area A or possible to happen in the specified area can be recognized by a user via the icon x which has a design corresponding to the situation information inf (A) to indicate the entry position $p_{in}$ to the specified area A (refer to FIG. 2/S223 and FIG. 4).

Further, when the vehicle Q approaches the entry position $p_{in}$ to the specified area A in the searched navigation route r, it will be recognized by the driver of the vehicle Q via the output of the approaching notification (refer to FIG. 2/S225).

Furthermore, it is possible for the user to take an appropriate action according to the situation information, such as determining whether to detour the specified area, issuing a re-searching instruction for another route to the navigation apparatus on the basis of the determination, or detouring along the outputted navigation route.

It is acceptable that the present position $p_1$ and the destination position $p_2$ of the vehicle Q is transmitted or uploaded from the navigation apparatus 200 to the navigation server 100, together with a navigation identifier for identifying the navigation apparatus 200, a support route joining the present position $p_1$ and the destination position $p_2$ is defined on the basis of the support map information or the like stored in the support map storing element 203 in the navigation server 100, and a link identifier of an individual link constituting a part of or the entire part of the support route is transmitted or uploaded as the road traffic information from the navigation server 100 to the navigation apparatus 200 having the navigation identifier. Thereby, in the navigation apparatus 200, the first processing element 210 may define a navigation route r which is partially or completely identical or similar to the support route (refer to FIG. 2/S212 and FIG. 3). In other words, the navigation route r may be defined or set in the navigation apparatus 200 according to a definition algorithm for defining the support route in the navigation server 100.

Although the present invention has been explained in relation to the preferred embodiments and drawings but not limited, it should be noted that other possible modifications and variations made without departing from the gist and scope of the invention will be comprised in the present invention. Therefore, the appended claims encompass all such changes and modifications as falling within the gist and scope of the present invention.

What is claimed is:

1. A navigation system comprised of a navigation apparatus which is configured to guide a mobile subject and a navigation server which is configured to support the guiding of a mobile subject performed by the navigation apparatus on the basis of communication with the navigation apparatus, wherein:

the navigation apparatus includes
   a first processing element which is configured to define a navigation route joining a present position and a destination position of the mobile subject on the basis of navigation map information stored in a navigation map storing element and road traffic information distributed or broadcasted from the navigation server; and
   a second processing element which is configured to recognize a specified area surrounded by a frame encompassing a road as a part of the specified area, and situation information representing a situation which affects the movement of the mobile subject in the specified area and relates to at least one of weather, natural phenomenon, and man-made disaster on the basis of communication with the navigation server,
   determine whether an entry position to the specified area is present in the navigation route defined by the first processing element, wherein the entry position is an intersection of the navigation route and the frame where the navigation route enters the specified area, and
   display on a navigation display an icon as a mark having a design in relation to the situation information only at the entry position on a map based on the navigation map on a condition that the presence of the entry position is determined; and the navigation server includes
   a first support processing element which is configured to recognize a specified area surrounded by a frame encompassing a road as a part of the specified area, and situation information representing a situation which affects the movement of the mobile subject in the specified area and relates to at least one of weather, natural phenomenon, and man-made disaster, both of which are stored in a situation information storing element; and
   a second support processing element which is configured to enable the navigation apparatus to recognize the specified area and the situation information recognized by the first support processing element on the basis of communication with the navigation apparatus.

* * * * *